June 29, 1965   D. W. HAMM   3,191,947
PISTON RING

Filed May 14, 1962   2 Sheets-Sheet 1

INVENTOR.
DOUGLAS W. HAMM
BY
ATTORNEYS

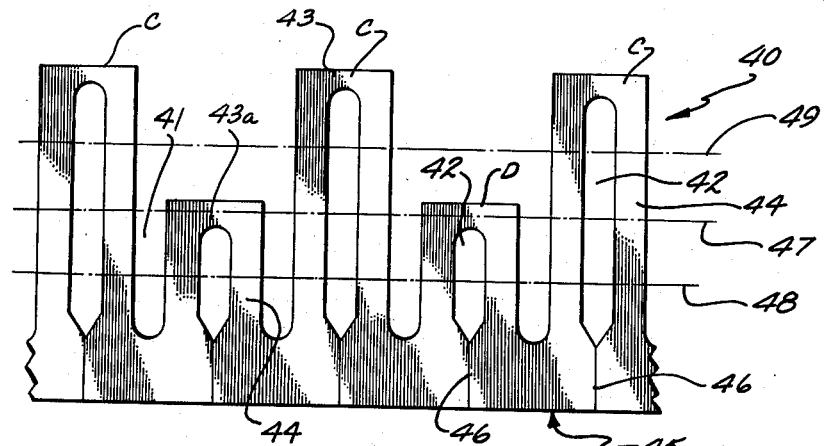
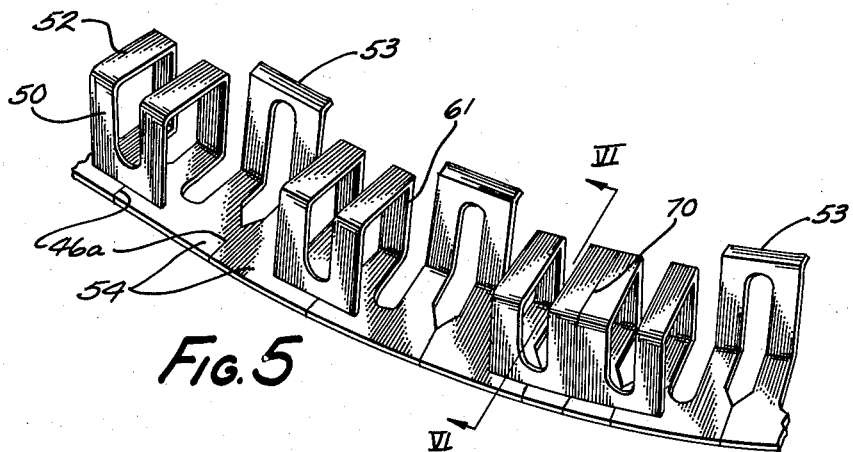
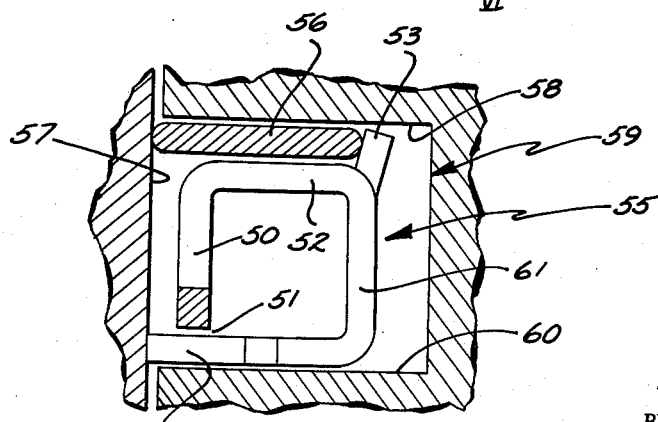

3,191,947
PISTON RING

Douglas W. Hamm, Muskegon, Mich., assignor to Muskegon Piston Ring Company, Muskegon, Mich., a corporation of Michigan
Filed May 14, 1962, Ser. No. 194,462
4 Claims. (Cl. 277—139)

This invention relates to a piston ring having two components making sealing contact with the cylinder wall. These members are spaced axially. One of them is a conventional parted rail or steel segment and the other is an integral part of the spacer-expander component of the ring.

In the design of piston rings, and more particularly of oil rings, it is particularly desirable that the ring be characterized by conformability and flexibility. It has long been known that piston rings consisting of a large number of integrally joined segments, each of which has a limited degree of freedom for radial movement with respect to adjacent segments, provides the ultimate in flexibility in piston rings. Many such rings have been developed in the past. These rings, however, because of their segmental nature, have the disadvantage of incorporating a large number of tiny gaps or partings which collectively permit significant leakage past the ring. For this reason, piston rings employing parted rails or steel segments have been favored even though they lack the conformability and flexibility of the other type.

Piston rings equipped with two parted rails are less flexible because the rail is an annulus normally having significantly greater radial depth than axial thickness. Thus, its inherent strength and continuity prevent its adjustment to the smaller inconsistencies of the cylinder wall. Further, because the rails must act as a single body, they have little segmental response and there is a significant time lag in their response. The same is true with regard to effecting side sealing against the sides of the ring groove. It is seen from these remarks that each type of cylinder wall sealing structure has certain desirable functional characteristics and certain functional disadvantages.

This invention provides a combination of a segmented cylinder wall engaging land and a rail, thus combining the desirable qualities of both of these structures. It utilizes the capabilities of one structure to offset the shortcomings of the other. The ring provides a rail seat at its upper side for mounting a conventional, parted rail which effects a seal against the cylinder wall characterized by a single parting. Preferably, this is placed at the upper side of the ring which is subjected to the greater pressures during operation since it is on the side adjacent the combustion chamber. Even in bi-rail type conventional rings, the top rail does the greater proportion of the significant sealing. The bottom or lower portion of this ring consists of a plurality of segments which seat against the lower side of the ring groove and also seat radially outwardly against the cylinder wall. These segments are an integral part of and interconnected by the body of the spacer which is designed to provide a springing action, furnishing unit pressure on each segment. Thus the lower land of the ring, because of its flexibility, is capable of conforming closely with the cylinder wall and of acting as an efficient scraper for lubricant attempting to enter the combustion chamber by passing upwardly between the piston and the cylinder wall.

This invention has other advantages. It is less costly than conventional rings utilizing two steel segments or rails. By reason of the elimination of one of the heavier rails and substituting for it a thinner, lighter land, the weight of the ring assembly is reduced. This reduces the intertia and momentum which cause deflection and thus seal impairment at each end of the operating stroke. Further, the design of this ring provides the land with inherent tension, eliminating the necessity for a backing spring to reinforce the tension of the ring. This again reduces weight and cost.

The ring has the advantage of functionally and structurally divorcing that portion of the ring which provides support for the rail from the portion of the ring which develops tension. Thus, the ring may be designed to accommodate rails of a wide variety of radial wall depth while at the same time maintaining sufficient radial depth in the ring to assure proper tension and satisfactory installation.

The ring also has the advantage of minimal structure. Both the rail seats and the rail stops are substantially spaced circumferentially. Thus the mass and weight of the main body of the ring is small. This reduces intertia and momentum at each end of the piston stroke. This is particularly important in high speed engines to reduce the amount of axial deflection or compression of the ring resulting from these factors. When excessive axial compression of the ring occurs the side sealing effect of the ring is repeatedly broken causing the ring to act as a pump, passing oil and gases around the ring through the ring groove.

The minimal structure also affords the ring a high degree of openness. Such rings have a tendency to remain cleaner, eliminating sticking due to accumulated sludges and carbons. Stuck rings are a common cause of blowby and unsatisfactory oil economy.

These and other objects and purposes of this invention will be immediately understood by those acquainted with the design and manufacture of piston rings upon reading the following specification and the accompanying drawings.

In the drawings:

FIG. 4 is a plan view of a blank for a modified design for this invention;

FIG. 5 is a fragmentary, oblique view of a ring body formed from the blank shown in FIG. 4 ready for installation of the rail;

FIG. 6 is a fragmentary, sectional, elevational view taken along the plane VI—VI of FIG. 5 showing a ring incorporating this invention seated in a ring groove.

In executing the objects and purposes of this invention, there has been provided a ring assembly having a rail and a spacer-expander body. The spacer-expander body supports the rail and along its lower outer radial edge is equipped with a plurality of separate segments designed to seat against the cylinder wall and effect a sealing and scraping contact therewith. The body of the spacer-expander provides radial tension both for the rail and for the segments. The ring body has circumferentially spaced, axially projecting leg pairs, alternate pairs serving as rail seats with the remainder serving as rail stops.

Figure 1:
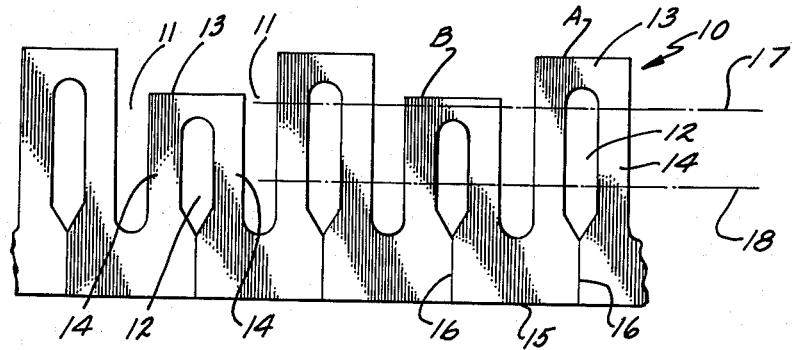
FIG. 1 is a plan view of a blank for a ring incorporating this invention.

Referring to FIG. 1, the numeral 10 refers to a blank having a first plurality of loops A and a second plurality of loops B. The blank 10 is a continuous ribbon with the loops A and B extending laterally of the blank. The loops A are longer than the loops B and are arranged alternately with respect to the loops B. Each of the loops B is separated from the adjacent loops A by a blind slot 11 which extends a substantial distance laterally across the width of the blank.

Each of the loops A and B has an internal aperture 12.

The apertures 12 are rounded at one end, leaving a bar 13 connecting the sides or legs 14 of the loops. The other end of each of the apertures 12 is preferably V-shaped with the bottom of the V being generally aligned lengthwise of the blank 10 with the closed or the blind ends of the slots 11. Extending from the apex of the V-shaped end of each of the apertures 12 to the edge 15 of the blank is a score line 16. In the preferred embodiment of this invention, the score line 16 penetrates the surface of the blank but does not pass through the blank or form a parting in the blank prior to the blank's being shaped into the finished ring. Thus, the blank adjacent the edge 15 is a continuous ribbon of metal. The purpose of this will appear more fully hereinafter. The edge 15 of the blank is a continuous straight line.

Figure 3:
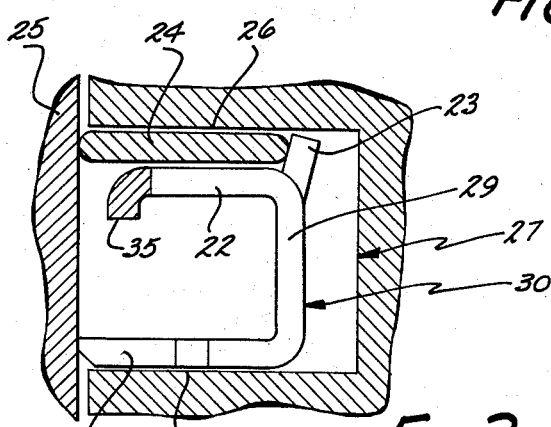
FIG. 3 is a fragmentary, sectional, elevational view of a ring incorporating this invention taken along the plane III—III of FIG. 2 installed in a ring groove.

To form the ring illustrated in FIG. 3, the blank is formed or bent about the bend lines 17 and 18. These lines are parallel and extend lengthwise of the blank. In this operation, all of the material of the blank below the bend line 18, as illustrated in FIG. 1, is bent to an angle of approximately 90 degrees from the portion of the blank confined between the bend lines 18 and 17. However, only the portions of the loops A which project above the bend line 17, as illustrated in FIG. 1, are bent along the bend line 17. When this bending or forming operation is completed, the portions of the blank below the bend line 18 and the portions of the loops A above the bend line 17 are substantially parallel. This gives the body of the ring a generally U-shaped cross section. The extremities of the loops A are also bent slightly downwardly toward the bottom of the ring to form a guiding radius or lip 35 to facilitate assembly of the rail to the ring.

Figure 2:
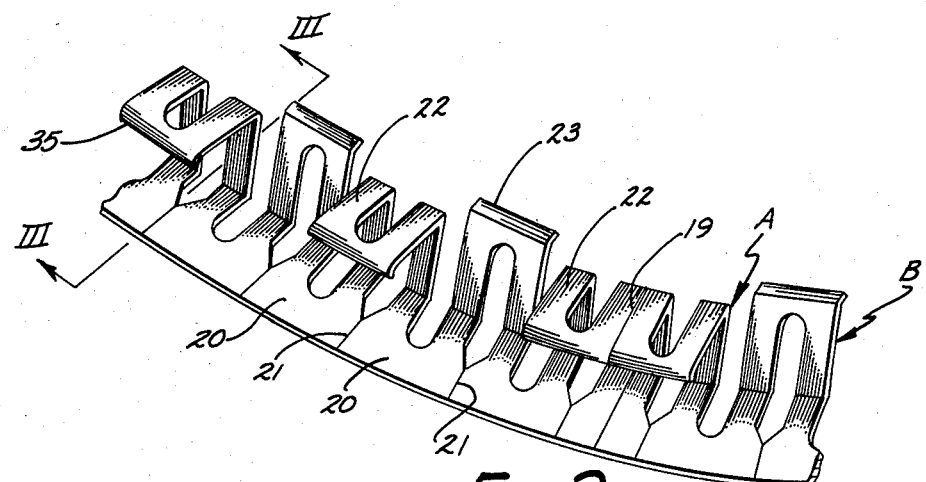
FIG. 2 is a fragmentary, oblique view of the ring body ready to receive the rail.

The ends of the loops B may be left straight or slightly inclined radially inwardly as suggested in FIGS. 2 and 3. After the blank has been formed to the cross-sectional configuration of the ring, it is heat treated and while hot coiled into a helical. It is then allowed to cool to permit it to reach a brittle hardness. It is then processed to crack or break it along the score lines. This forms a part or line of separation 21 (FIG. 2) at each score line extending through the outer radial portion of the ring, dividing this outer portion into a plurality of individual segments. The coil is then heat treated and drawn or stretched to open slightly the cracks or joint created by breaking the ring along the score lines. The coil is then cut to length, forming the individual rings. The stretching operation provides tension in the finished ring. If this were not done the ring would lock up at the joints and have infinite tension. This would be ineffective.

The coiling is done in such a manner that the legs 14 are on the inner diameter of the ring with the bent over ends of the loops A extending radially outwardly. In the coiling, the edge 15 of the blank is formed into a continuous circle so that each segment of the edge 15 defined between a pair of the score lines 16 is arcuate and forms a part of a circle. The ring thus formed in butted at a suitable point such as at 19 (FIG. 2). The ring is then heat treated to the desired hardness and resiliency.

The particular process of heat treating the formed blank and cracking it along the score lines does not form a part of this invention. It is taught in United States Patent No. 2,668,131 entitled Method of Making Piston Rings, issued February 2, 1954.

The breaking of the score lines 16 forms a plurality of land segments 20 collectively extending entirely around the ring at its lower outside corner. These segments initially abut each other since the forming of the separations or parts 21 at each of the score lines 16 is accomplished after the ring has been completely formed to the shape it assumes when in use. However, the segments are slightly separated by the subsequent stretching or drawing of the blank.

Each of the segments 20 is attached to one leg of one of the loops B and to an adjacent leg of one of the loops A and provides the only structural connection between these loops. The bent over portions of the loops A form the rail seats 22 of the ring. The upper ends of the loops B form the rail stops 23. To complete the ring, a steel segment or parted rail is seated on the rail seats 22 with its inner radial edge butting against the rail stops 23 (FIG. 3). The outer radial edge of the rail butts against and forms a sealing contact with the cylinder wall 25. The supper face of the rail 24 seats against and forms a seal with the upper side 26 of the ring groove 27. The radial outer edge of the segments 20 butts against the cylinder wall 25 and forms a scraping seal with this surface. The segments 20 also seat against the lower side 28 of the ring groove 27. The legs of the loops A and B which were confined between the bend lines 17 and 18 form the inner bight 29 of the ring (FIG. 3), holding the rail seats 22 in axially spaced relationship to the segments 20.

Since the aperture in both the loops A and B extend not only to the inner radial edge of the ring body but also up the inner radial face, the ring body has a high degree of radial flexibility. This is desirable in supporting the rail 24. It also affords each segment 20 a significant degree of functional independence.

FIGS. 4, 5 and 6 illustrate a modified form of this invention. The blank 40 is a continuous ribbon with the loops C and D extending laterally of the blank. The loops C are longer than the loops D and are arranged alternately with respect to the loops D. Each of the loops D is separated from the adjacent loops C by a blind slot 41 which extends a substantial distance laterally across the width of the blank. The shape and construction of the blank 40 is identical to that of the blank 10 with the exception that the loops C are longer.

Each of the loops C and D has an internal aperture 42. The apertures 42 are rounded at one end, leaving a bar connecting the sides or legs 44 of the loops. The loops C have the bars 43 and the loops D the bars 43a. The other end of each of the apertures 42 is preferably V-shaped with the bottom of the V being generally aligned lengthwise of the blank 40 with the closed or the blind ends of the slots 41. Extending from the apex of the V-shaped end of each of the apertures 42 toward the edge 45 of the blank is a score line 46. The score line 46 penetrates the surface of the blank but does not pass through the blank or form a parting in the blank prior to the blank's being shaped into the finished ring. Thus, the blank adjacent the edge 45 is a continuous ribbon of metal.

To form the ring illustrated in FIG. 5, the loops D of the blank 40 are bent along the parallel bend lines 47 and 48 and the loops C are bent along the three parallel bend lines 47, 48 and 49, extending lengthwise of the blank. This gives the ring its basic tubular or boxlike cross-sectional configuration. Between the bend line 49 and the adjacent ends of the loops, the ends of the loops C, including the bar portion 43, are bent downwardly parallel to the portion between the bend lines 47 and 48. These portions form the pressure legs 50 which extend down almost into contact with but preferably, do not contact the land portion of the ring. A gap 51 (FIG. 6) of 0.001–0.005 of an inch is normally left. The portions of the loops C between the bend lines 47 and 49 form the rail seats 52. The alternate loops D project upwardly from the land portion with their ends, i.e. the bar portions 43a, serving as rail stops 53.

As in the case of the ring 10 illustrated in FIG. 2, the blank 40 is shaped to its final cross-sectional configuration, heat treated and coiled before the score lines 46 are broken. Thus, during the coiling operation, there is a continuous strip or ribbon of material running the full length of the edge 45. Once again, this is done to effect a constant curvature of the edges between the score lines so that the outer edges of the ring define a true, smooth circle rather than a circle comprised of a series of short, straight segments. The breaking or cracking of the blank at the score lines 46 creates a plurality of separate segments 54 along what was originally the edge 45 of the blank. These segments 54 are separated by partings or lines of separation 46a (FIG. 5).

In the completed ring body the ends of the ring are butted at 70. The segments 54 connect the sides or legs defining the sides of one of the slots 41 while the segment bars 43 and 43a connect the sides or legs defining an aperture 42. Thus, each leg at one end is connected to an adjacent leg spaced from it in one direction and at the other end is connected to an adjacent leg spaced from it in the opposite direction. This affords the ring body a high degree of flexibility.

To complete the finished ring 55, a parted steel segment or rail 56 is mounted on the rail seats 52. Its assembly to the rail seats is facilitated by the guiding effect of the pressure legs 50. The presence of the pressure legs 50, positively prevents improper assembly of the rail and ring body by closing the outer radial face of the ring body to entry by the rail. The inner radial edge of the rail 56 bears against the rail stops 53 while its outer radial edge bears against the cylinder wall 57. The upper surface of the rail 56 bears against the upper side 58 of the ring groove 59.

The segments 54 seat against and make scraping and sealing contact with the cylinder wall 57. They also seat down against the lower face 60 of the ring groove 59. The inner radial or bight portion of the ring is formed by the legs 61 which connect the rail seats 52 to the segments 54. The legs 61 provide the axial support holding the rail seats 52 in spaced, axial relationship to the segments 54.

The functional characteristics of the ring 55 formed from the blank 40 illustrated in FIG. 4 are similar to those of the ring 10 formed from the blank 10 illustrated in FIG. 1. It will be noted that the apertures 42 in the loops C of the blank extend all the way into the pressure legs 50. Also, the apertures extend up the loops D of the blanks a substantial portion of their height. This gives the entire ring body a high degree of flexibility and the individual land segments 54 significant functional independence. It also produces a ring having a high degree of openness as well as being comparatively lightweight.

A more important advantage of the construction illustrated in FIGS. 4–6 is the support afforded the land segments 54. When this type of ring is installed with the land segments as the first part of the ring to enter the cylinder bore, damage to the land segments is experienced all too frequently. This damage occurs when the land segments are bent upwardly by catching on the edge of the bore as the piston is pushed into the bore. When the land segments are bent excessively, they do not return to their initial position, creating excessive gaps between these segments and adjacent ones. Also they do not seat properly against the cylinder walls and side of the groove. The result is a poor oil seal and unsatisfactory oil economy.

The presence of the pressure legs 50 eliminates this difficulty. Once the gap 51 is closed, the pressure legs provide positive support for the land segments closely adjacent their outer radial edge. This prevents excessive bending, assuring the installation of a structurally sound and functionally satisfactory ring. Since the gap 51 is designed to be from 0.001 to 0.005 of an inch wide, the degree of bending occurring before contact occurs between the land segments and the pressure legs is negligible. Since the upper ends of the pressure legs 50 bear directly against the lower side of the rail 56 which in turn is supported by the upper side 58 of the ring groove 59, the land segments are afforded positive support. At the same time the gap 51 permits limited flexing of the lands during operation. This is necessary to give the desired cushioning effect to the ring rather than a rigid structure which will not effect the desired degree of sealing. Although the pressure legs 50 are substantially spaced apart by the legs forming the rail stops, the arrangement of the pressure legs assures support for every individual segment by one of the pressure legs.

While the addition of the pressure legs 50 adds some closure to the outer face of the ring, the ring is still basically characterized by openness.

This invention in both forms provides a superior oil ring. It combines the sealing effect of a steel segment or rail having but a single parting with the flexibility and conformability of a segmented scrapping land. Since the rail forms a seal with only a single parting, the fact that a number of partings exist in the segmented scraping land portion of the ring does not adversely affect the function of the ring. At the same time, the ring has the benefit of the clean scraping effect of the segmented scraping lands which are able to flex readily and closely fit against the cylinder wall to scrape excessive lubricant from these walls and thus confine it to the crankcase.

Each of the constructions illustrated assures application of positive radial tension upon each land segment. The shape of the body after the score lines have been broken or ruptured is that of a continuous, zig-zag spring. This provides both flexibility and tension. Further, each segment has a high degree of independence of movement. Thus, the scraping edge formed by the land segments is highly flexible and capable of maintaining an effective scraping action at all times. The length of the legs supporting the land segments is important in producing this effect.

The construction of the ring permits the ring to be formed into its circular shape before formation of the partings or separations which define the segments of the lower land. Thus, the partings are formed when the ring has attained its final shape and the partings, when the ring is installed in the cylindler have so small an opening that the passage of lubricant through the partings is reduced to an absolute minimum. This is important in forming a ring having a highly efficient oil seal. Further, this process permits each of the segments to be a portion of a continuous curve. In this manner the entire outer radial surface of each land seats against and makes full contact with the cylinder wall to form a firm and positive scraping engagement.

This invention provides a ring with sufficient radial tension to effect proper sealing engagement with the cylinder wall both by the rail and the land scraping segments. This is important to keep the oil confined to the crankcase. At the same time the construction of the ring permits it to effect proper sealing engagement between the rail and the upper side of the ring groove and the land segments and the lower side of the ring groove. This is also important in preventing leakage past the ring between the ring and the sides of the ring groove. The ring allows the amount of side pressure effected against the land segments and the rail to be accurately controlled so that the pressure is sufficient to form the seal without at the same time causing a bind between either the rail or the segments and the sides of the ring groove. The presence of the pressure legs 50 positively spaces the rail 56 and the land segments 54 axially and maintains this spacing during the ring's operation. Thus, this spacing having been properly determined initially, will remain constant after the ring has been placed in operation. This also assures sufficient freedom of the rail and the segments to effect conformity to the cylinder walls.

The design of this ring permits the radial depth of the ring to be independent of the radial depth of the steel segment or rail. The loops B and D need not be bent on the same bend line as the loops A and C respectively. These loops may be made shorter or longer and bent either closer to or further from the edge 15 or 45. This permits adjustment of the rail depth without variation of the radial thickness of the ring, its basic flexibility or tension value. This permits rails having a wide variety of radial depths to be utilized with this ring without impairing the radial tension of the ring and without increasing or decreasing the over-all radial depth of the ring such that it will interfere with the ring's proper installation. At the same time the construction of the ring provides a spring structure co-operating with the individual land scraping segments in such a way that the degree of the unit pressure applied to the land segments has a high degree of uniformity throughout the circumference of the ring.

It will be seen that this invention provides a ring combining a number of advantageous characteristics which have never heretofore been combined in a single ring. While a preferred embodiment together with a modification of this embodiment have been illustrated and described, it will be recognized that other modifications of this invention may be made. It should also be understood that while the rings have been described with the rail on top and the land segments on the bottom, this invention is not limited to this particular arrangement. It is within the scope of this invention to invert this structure, placing the rail on the bottom and the land segments on the top. This and such other modifications as incorporate the principles of this invention are to be considered as covered by the hereinafter appended claims unless these claims by their language expressly state otherwise.

I claim:

1. A piston ring comprising: a radially extending flat circular land portion forming the lower outer radial corner of said ring; said land portion being subdivided into a plurality of short segments and collectively providing a continuous scraper member; a plurality of fingers; said fingers at one end being bifurcated to form axially extending legs arranged in pairs, one leg of each pair being integral with a different land segment; said legs at the ends remote from said land segments being integrally joined and forming the only connection between adjacent land segments; portions of said fingers forming the axially extending inner bight portion of said ring and other portions of alternate pairs of said fingers forming the upper side of said ring; a portion of said upper side of said alternate pairs of said fingers being offset toward said land segments and forming rail seats; the remaining of said pairs of said fingers extending generally axially and forming stops for engaging the inner radial edge of a rail segment; the ends of said alternate pairs of said fingers radially outwardly of said rail seats extending parallel to said bight portion and substantially closing the outer radial face of said ring.

2. A piston ring as recited in claim 1 wherein a parted rail segment is provided; said rail segment being seated on said rail seats and against said rail stops.

3. A piston ring comprising a body element having a radially projecting upper side and a radially projecting lower side; a portion of said body element extending axially of said ring as circumferentially spaced members; certain of said members supporting said upper and lower sides in axially spaced relationship; said upper side of said body element being characterized by a plurality of circumferentially spaced rail seats integral with said certain members; the remainder of said members forming rail stops adapted to engage the radial inner edge of a rail; the radially outer ends of said rail seats being bent to form pressure legs generally paralleling said axially extending portion of said body element and terminating proximate to said lower side thereof; said lower side of said body element being characterized by subdivision into a plurality of radially projecting land segments each integral with said body element and movable radially and axially independently of adjacent land segments, said land segments collectively providing a continuous scraper member and adapted to make scraping contact with a cylinder wall.

4. A piston ring as recited in claim 3 wherein a parted rail segment is provided; said rail segment being seated on said rail seats and against said rail stops.

References Cited by the Examiner
UNITED STATES PATENTS

| 2,596,286 | 5/52 | Philips | 277—140 |
| 2,635,022 | 4/53 | Shirk | 277—140 |
| 2,859,079 | 11/58 | Olson | 277—139 |
| 2,999,728 | 9/61 | Estey | 277—139 |

EDWARD V. BENHAM, Primary Examiner.

SAMUEL ROTHBERG, Examiner.